United States Patent [19]

Hardy et al.

[11] Patent Number: 4,553,350

[45] Date of Patent: * Nov. 19, 1985

[54] METHOD AND APPARATUS FOR APPLYING CHEMICALS TO WEED AND PLANTS

[76] Inventors: James H. Hardy, P.O. Box 259, Rt. 2; James E. Roberson, 220 Bates St., both of Batesville, Miss. 38606

[*] Notice: The portion of the term of this patent subsequent to Feb. 12, 1997 has been disclaimed.

[21] Appl. No.: 102,532

[22] Filed: Dec. 11, 1979

Related U.S. Application Data

[63] Continuation-in-part of Ser. No. 945,875, Sep. 26, 1978, Pat. No. 4,187,638.

[51] Int. Cl.⁴ .............................................. A01N 5/00
[52] U.S. Cl. ...................................................... 47/1.5
[58] Field of Search ............... 47/1.5; D8/2; 401/261, 401/268, 283, 286; 15/209 R–209 D, 228, 229 R

[56] References Cited

U.S. PATENT DOCUMENTS

| | | | |
|---|---|---|---|
| 4,187,638 | 2/1980 | Hardy et al. | 47/1.5 |
| 4,219,964 | 9/1980 | Dale | 47/1.5 |
| 4,309,842 | 1/1982 | Jones | 47/1.5 |
| 4,332,106 | 6/1982 | Barton et al. | 47/1.5 |

Primary Examiner—Robert E. Bagwill
Attorney, Agent, or Firm—Brisebois & Kruger

[57] ABSTRACT

The apparatus includes an elongated hollow body with exposed portions of wick extending along the body and having inner portions extending into the body through openings of the body. Each end of an exposed portion is peripherally sealed with respect to the body opening through which it extends, and inner portions of the wick communicate with a chemical in the body. Exposed portions of the wick span the length of the body and the chemical is applied by moving the body horizontally across a field in a direction transverse to its length. The wick material can be braided nylon rope, and the body can be made of any selected length for multi-row application of the chemical.

8 Claims, 8 Drawing Figures

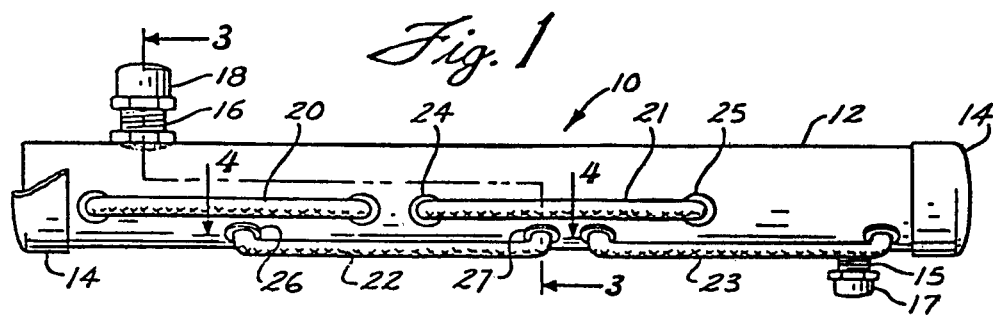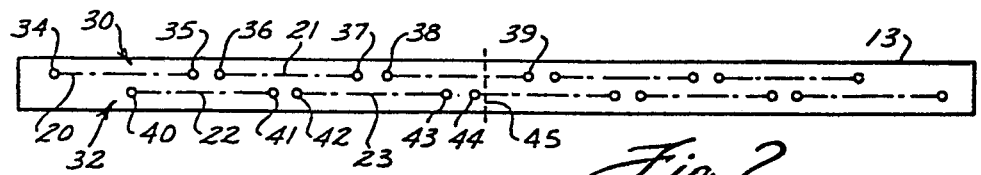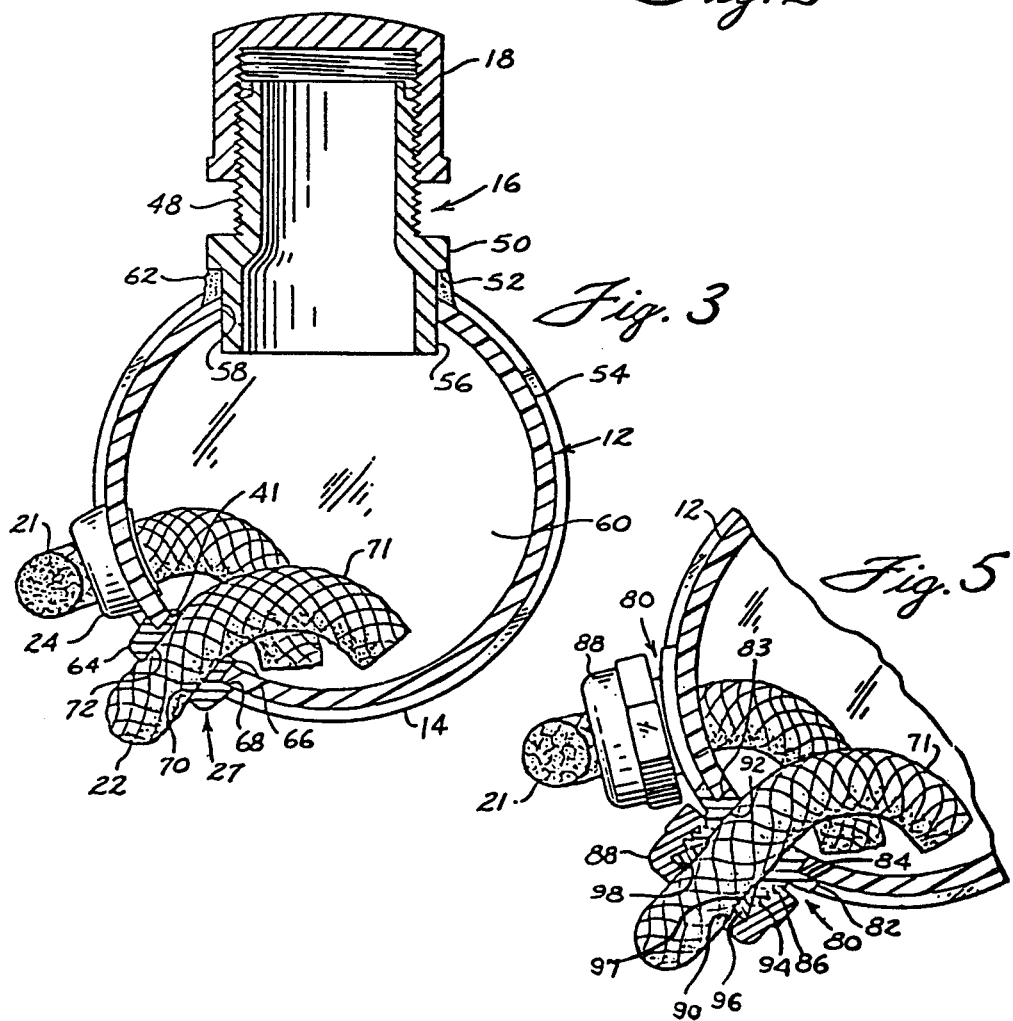

METHOD AND APPARATUS FOR APPLYING CHEMICALS TO WEED AND PLANTS

RELATED APPLICATIONS

This application is a continuation-in-part of our prior copending application, U.S. Ser. No. 945,875, filed Sept. 26, 1978 now U.S. Pat. No. 4,187,638.

BACKGROUND OF THE INVENTION

This invention relates to a unique apparatus for applying chemicals to plants such as crops and weeds.

The invention also relates to a unique method of using the apparatus.

While the apparatus can be used to apply virtually any type of chemical or liquid to plants, the method and apparatus of this invention have particular utility for the application of a herbicide to weeds in a field which have grown higher than the crop.

Non-selective herbicides are presently available which can kill virtually any plant simply by applying a very small amount of the herbicide to a small area of foliage of the plant. Such herbicides are used extensively to kill undesirable vegetation such as weeds or Johnson grass which have grown to a height greater than the desirable cultivated crop, such as cotton.

One commercially used technique for applying such a non-selective herbicide to weeds taller than the crop, is a spray-recovery system, where the herbicide is sprayed above the level of the cultivated crop, to contact the portions of weeds which have grown higher than the crop, and the excess sprayed weed killer is collected in a recovery receptacle and is recycled back to the sprayer. While such a system and technique is satisfactory, and applies the weed killer primarily to the weeds without application to the cultivated crop, the equipment is quite expensive, and clogging of the recirculation system sometimes occurs, especially under dusty conditions.

Correspondingly, there is a need for an inexpensive, durable, and reliable apparatus for applying chemicals to field crops. This invention provides such an apparatus, as well as a unique method of applying chemicals to plants with the apparatus.

FIELD OF THE INVENTION

One form of the invention relates to apparatus for applying herbicides and other chemicals to weeds or plants growing in a field by drawing the apparatus across the field with wick portions of the apparatus at a predetermined height and disposition to contact and moisten the plants. This form of invention is especially useful for applying herbicides to undesirable vegetation which has grown taller than the cultivated crop. The invention also relates to a hand manipulated applicator for applying liquid chemicals to weeds, either in a field or in a lawn or garden.

DESCRIPTION OF THE PRIOR ART

As previously mentioned, it is known to use a spray-recovery system to apply chemicals only to plants higher than the cultivated crop growing in a field.

Known prior art U.S. patents for applying a liquid chemical to plants are:

| U.S. Pat. No. | Patentee |
|---|---|
| 910,933 | Mahanay |
| 1,507,595 | Goode |
| 1,527,669 | Camp |
| 1,764,952 | Hay |
| 2,123,988 | Corley |
| 2,311,782 | Segars |
| 3,320,694 | Biron |
| 4,019,278 | McKirdy |

Mahanay and Camp disclose the use of cloths supplied with a chemical from a reservoir or piping, and which contact the plants to apply the chemical. Such cloths quickly deteriorate and are torn, and in addition, it is difficult to prevent dripping of the chemical from the cloths onto the cultivated crop when herbicides are used.

Hay, Segars and Corley disclose mop-type wick applicators which wear out quickly and frequently drip thereby either wasting some of the chemical or dripping the chemical onto the cultivated crop when herbicides are used.

Biron and McKirdy relate to perforated tube applicators covered with a sleeve which is moistened and applies the chemical to the crop. Such sleeves wear out quickly and dripping is not uncommon, unless a chemical of relatively thick consistency is used as in Biron, but the use of a thick chemical requires a pressure source to force the chemical to the applicator sleeve.

Goode requires multiple bars of felt on a rotatable drum to apply the chemical to the plants. Such a rotatable drum is expensive and requires a substantial amount of relatively expensive felt as the applicator material.

SUMMARY OF THE INVENTION

In accordance with this invention, the shortcomings and problems of the prior art devices are alleviated by providing a very inexpensive but durable applicator for applying a chemical to plants by drawing the applicator across a field while horizontal and at a predetermined height, or with a hand-held unit.

In one form of the invention, a body portion of the apparatus takes the form of a length of plastic pipe with closed ends and of sufficient diameter to form a reservoir for the chemical. There is a filling opening to permit filling the body with the chemical, and a plurality of rope-like wick elements each of a predetermined exposed length on the outside of the body. Each wick is connected to the body at each end of the exposed length, so that there are no dangling or badly drooping portions of the exposed length which could cause dripping of the chemical. The portions of the wicks connected to the body are lengths of the wicks which are continuations of the exposed portions, and those continuation lengths of the wicks communicate with the interior of the body and cause the chemical to wick to the exposed lengths. These continuation lengths of the wick are unexposed and each continuation length is sealed with respect to the body at a location between the portion of the length communicating with the body and the exposed length to prevent the chemical from flowing from the body along the outer surface of the wick.

In one preferred embodiment, the lengths of the wicks which communicate with the body extend through openings in the body and have free ends in the body. In this embodiment the seals are rings or grommets, preferably resilient, which encircle and seal the wicks to the body adjacent the body openings.

In another embodiment, the continuation lengths of the wicks are sealed with respect to the body by seals on nipples or pipes connected to and communicating with the interior of the body. These seals can be energized by a compression nut or fitting.

In another form of the invention the applicator is hand held, is composed of hollow pipe, and has a wick extending into opposite ends of the applicator head. In this version a handle communicates with the applicator head and the handle and head form a reservoir for the liquid chemical.

In each embodiment, the wicks each take the form of a length of rope of a synthetic material such as DACRON, NYLON, or polypropylene, solid braided NYLON rope being preferred. While cotton rope can be used with some chemicals, cotton rope does not wick properly with most weed killers.

Advantageously, the wick elements are held rigidly by the body and the rope-like wicks are quite durable and resistant to abrasion and wearing out by contact with even sharp bladed weeds. By virtue of this construction, where durable wicks are used, and the wicks are maintained in a predetermined pattern on the body, the applicator is easy to use and manipulate, and dripping of chemical is wholly avoided since there are no dangling ends where the chemical tends to accummulate.

The exposed lengths of the wicks are preferably parallel to each other and extend along the outside of the body. The exposed lengths of the wicks form an overlapping array longitudinally of the body to assure application of the chemical to plants along the entire length of the body. In the preferred embodiments, the wicks are parallel to the length of the body.

Advantageously, the exposed lengths of the wicks extend along only a predetermined sector of the body, this sector being less than one-half the circumference of the body so that the exposed lengths of the wicks are all on the same side of the body, this sector preferably not exceeding 90°. The applicator is used by, for example, mounting it on the hydraulic lift mechanism of a tractor, in a horizontal position transverse to the tractor, and moving the tractor across the field. Mounting the apparatus on the lift mechanism facilitates adjustment of the height of the applicator so that the applicator can be maintained just above the top of the cultivated crop and weeds at a height greater than the crop are engaged by the wicks to apply the herbicide only to the weeds. The applicator is mounted on the tractor so that the sector with the exposed lengths of the wick faces forwardly and downwardly to effectively cause the wicks to contact the weeds.

Correspondingly, it is an object of this invention to provide an apparatus for applying a chemical to plants which is rugged, durable, and applies only a desired amount of the chemical to the plants.

Another object is a weed killer applicator for plants fabricated from primarily plastic materials and using rope wicks in a predetermined array along the length of the applicator to apply a week killer to weeds of a height greater than the cultivated crop, by moving the applicator across a field at a height just above the height of the cultivated crop.

An additional object is a weed killer applicator of unique construction which can be formed in any desired length, which is quite inexpensive to manufacture so that it can be sold at a price as little as 10% of the price of previous commercial weed killer applying apparatus, is extremely simple in construction, yet is durable, long-lasting, and applies the desired amount of the weed killer.

A further object is a wick-type weed killer applicator in which the wicks take the form of lengths of plastic material rope, preferably braided, and which can be NYLON, DACRON, or polypropylene, with solid braided NYLON rope being preferred.

A further object is a method of applying weed killer by using the applicator of the preceding objects.

A further object is a hand held applicator with a handle and head of tubular plastic material cooperating to form a reservoir, and a single wick extending into ends of the head.

Additional objects, features, and advantages of the invention will become apparent with reference to the accompanying drawings.

BRIEF DESCRIPTION OF THE DRAWINGS

FIG. 1 is a front view of the apparatus, according to this invention, for applying chemicals to plants, with portions cut away for purposes of illustration;

FIG. 2 is a view of a body on a smaller scale rotated upwardly with respect to the position of FIG. 1, and showing the hole pattern formed in the body for receiving the wick elements;

FIG. 3 is an enlarged view in section taken along line 3—3 of FIG. 1;

FIG. 5 is a partial view corresponding to FIG. 3 and showing a second embodiment of a seal arrangement according to the invention for sealing the wick to the body;

DETAILED DESCRIPTION OF PREFERRED EMBODIMENT

Figure 4:
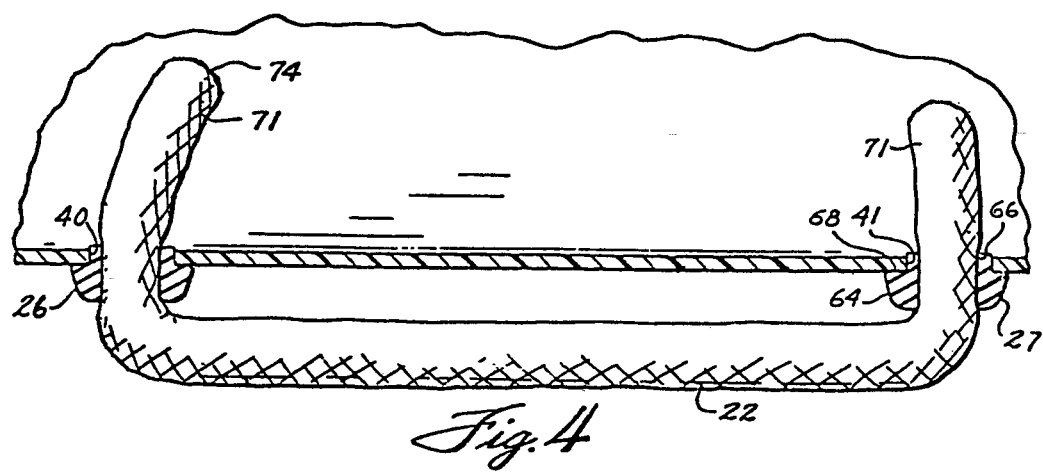
FIG. 4 is an enlarged partial view in section taken generally along line 4—4 of FIG. 1, but perpendicular to the radius of the body.

With reference to the drawings, and particularly FIG. 1, there is shown a weed killer applicator 10 in accordance with this invention. Applicator 10 includes an elongated hollow body 12 of extruded plastic material which is of essentially uniform section along its length. The ends of body 12 are closed by end caps 14 which are sealed to each end of the body with a suitable cement so that the body and end caps form a reservoir for the chemical to be applied to the plants. Mounted on body 12 adjacent one end of the body is a filling neck 16 which is closed with a threaded cap 18. There is also a drain 15 at the bottom and normally it is closed by a cap 17.

On the outside of body 12 are exposed lengths of wick 20–23 each of which is of circular cross-section. Each length of wick extends into the interior of body 12 through two annular seals such as seals 24, 25, located at the opposite ends of exposed portion 21, and seals 26 and 27 located at the opposite ends of exposed portion 22. As will soon be described, in accordance with one embodiment of this invention, these seals take the form of rubber grommets.

FIG. 2 shows a length of body material 13 from which the body 12 of FIG. 1 can be formed. Body material 13 is preferably 3" nominal diameter PVC pipe which has an inside diameter of 3" and a wall thickness of approximately ⅛". This pipe is commonly available under the name "Western Soil Pipe" or Schedule 26 PVC pipe with working pressure of 160 PSI. As shown in FIG. 2 there is a pattern of openings formed in body material 13 to receive inner or unexposed portions of the wicks. As shown, there is a first or upper row of openings 30 and a second or lower row of openings 32. Openings of row 30 include pairs of two openings such as pairs of 34, 35, pairs 36, 37, and pairs 38, 39. Row 32 similarly has pairs of openings 40, 41, and pairs of openings 42, 43. As is evident from FIG. 2, the row of openings 30 is parallel to the row of openings 32 and each of these rows is parallel with the longitudinal axis of the body. The openings of rows 30 and 32 can be drilled through the wall of the body, or can be formed in any other suitable manner. It is to be noted that the body 12 of FIG. 1 is shorter than the length of body material 13 as shown at FIG. 2. To form body 12, body material 13 is formed only with openings 34–37 and 40–43. Additional openings such as 38 and 44 are not formed, and body material 13 is cut along dotted line 45.

The applicator shown at FIG. 1 is called a one row applicator, since the length of body 12 spanned by exposed lengths 20–23 of the wick equals the center to center distance between the rows of a field in which the applicator is used. As is evident from FIG. 2, the applicator can be made of any desired length to span a plurality of rows, for example, as many as four rows of, for example, a cotton field. The overall length, however, of the body for a certain number of rows will of course depend on the spacing between the rows of the planted crop, and the length of the body spanned by the exposed lengths of wick will be an even multiple of the distance between the rows of field. For cotton, where the distance between rows is 32", the distance spanned by a single row is on the order of 32", and a four-row applicator will then have a body greater than 128" in length. End caps 14 are each schedule 40 PVC pipe caps for use with the 3" nominal diameter PVC pipe from which body 12 is formed. Such caps can be used to close the ends of the body after the body is cut to length, and facilitate constructing the applicator in any desired length.

As shown at FIG. 3, filling neck 16 is of plastic material, preferably PVC, and takes the form of an externally threaded nipple having a flange 50 which presents a shoulder 52 which abuts against the exterior surface 54 of body 12, and has a short integral pipe portion 56 extending through an opening 58 in the body 12 to communicate with the interior 60 of the body. Filling neck 16 is secured and sealed to the body with a plastic material cement 62.

As shown at FIGS. 3 and 4, each grommet such as grommet 27 has a head portion 64 of a greater diameter than a sleeve portion 66 to provide a shoulder 68 between the head and sleeve portions. Extending through grommet 27 is a through opening 70 through which one end of exposed portion 22 of wick extends, to provide an unexposed or inner portion 71 within body 12 to wick the chemical from within the body to the exposed portion by wicking and capillary action. The through opening 70 in grommet 27 is advantageously of a relaxed diameter somewhat less than the diameter of the wick. Such dimensioning causes the grommet to tightly grip and radially compress the portion 72 of the wick which is encircled by the grommet. Such gripping prevents any leakage of the chemical within body 12 along the outside of the wick and also firmly secures the wick on the body. The opening 43 in the body which receives grommet 27 has a diameter such that sleeve portion 66 of the grommet is a force fit in the opening to enhance the gripping action on the wick. When installed, as shown in FIG. 3, shoulder 68 of grommet 27 abuts the outside surface 54 of body 12, and the grommet is secured to the body with a suitable plastic cement.

As shown at FIG. 4, each wick takes the form of a length of the wick material with an exposed length such as 22 and unexposed lengths 71 which extend into body 12, these unexposed lengths each terminating at an end 74. Correspondingly, there are a plurality of separate individual wicks, each wick having both its ends extending through two grommets into the interior of the body 12. These inner ends are wet by the chemical in the body, and the wicks transmit the chemical to their exposed portions outside the body by wick and/or capillary action.

Each wick advantageously takes the form of a length of rope of plastic material, which can be DACRON, NYLON, polypropylene or any other material capable of feeding the chemical to be applied to the plants by wick or capillary action. For applying a weed killer to the plants, excellent results are obtained where the wick is solid braided loose woven NYLON rope.

In the preferred embodiment, the NYLON rope is ½" in diameter. The through opening 70 in a grommet, as previously mentioned, is slightly smaller than the outside diameter of the wick rope. Where the rope is ½" in diameter, the relaxed diameter of through opening 70 is preferrably 7/16". This provides the necessary gripping and compression of the rope to prevent leaking of the chemical along the outside of the rope and causes the sleeves to tightly grip the rope. As is evident from FIG. 4, each exposed portion of a wick such as the portion 22, is spaced from the body 12 by the heads of the grommets through which the opposite ends of the wick extends.

Where ½" diameter rope is used as the wicks, the center to center distance of pairs of holes 34, 35 (FIG. 2) and 36, 37 for example, is 8". It is preferred that about 4" of each wick extend into the interior of body 12 to provide the necessary feed action. Correspondingly, each wick is approximately 18" long, with about 8" exposed outside the body and 2" of its length within the body. Depending on the type of chemical length to be applied with the applicator, the exposed portion of each wick can be from between about 6" and 10" (rather than 8 inches), and the lengths of the inner unexposed portions 71 can be varied if necessary to provide the desired flow of the chemical to the exposed portions. A preferred spacing between the ends of the exposed portions is approximately 1-½" and correspondingly, the distance between the center lines of openings such as 35, 36 and 37, 38 is approximately 1-½".

During assembly, it is preferred to first force the opposite ends of a wick through its respective grommets, so that the exposed portion 22 has the desired length. Next, cement is applied to the sleeve 66 and shoulder 68 of each grommet, and the grommets are forced into a selected pair of openings in the body such as openings 40 and 41 to the position shown for wick 22 at FIG. 4.

FIG. 5 shows a second embodiment of the applicator of this invention. This embodiment is in all respects identical to the embodiment of FIGS. 1 and 3 save that a different arrangement is used to seal and secure the wicks to the body. As shown at FIG., instead of the grommets 24 and 27, externally threaded nipples 80 of plastic material are secured to the body at each of the openings through which a wick extends. These nipples each have a flange 82 which seats against the outside of the body, and a short bushing section 83 which extends into a body opening, and which has a length approximating the wall thickness of the body. The flange presents a shoulder 84 which abuts the body. An externally threaded outer pipe portion 86 of the nipple has threaded thereon a cap 88 having a central opening 90 of the same diameter as the through opening 92 in nipple 80. Where the wick is ½" in diameter, openings 90 and 92 are also one-half inch in diameter.

The outer end of pipe portion 86 of the nipple is flared outwardly to provide a frusto-conical seat 94 for a seal ring 96 which can be of trapezoidal or triangular section, and which is disposed between the seat 94 and a transverse annular surface 98 of cap 88. As cap 88 is threaded onto nipple 80, seal ring 96 is forced radially inwardly into tight gripping and sealing engagement with a short length of the exterior surface of the wick. Seal ring 96 can be of rubber or flexible plastic material and has a cylindrical inner surface 97. The extent of compression and sealing of the wick is readily controlled by manipulation of nut 88, which functions as a compression nut.

In the embodiment of FIG. 5, nipples 80 are first secured to the body by inserting the bushing portion 83 into a body opening, and cementing the nipple to the body. Next, a nut 88 and then a seal ring 96 are pushed over each end of a wick, and the wick ends are then inserted through a pair of nipples on the body. The nuts are then threaded onto the threaded portions of the respective nipples and tightened to both seal and grip the opposite ends of the exposed portions of the wick.

Figure 6:
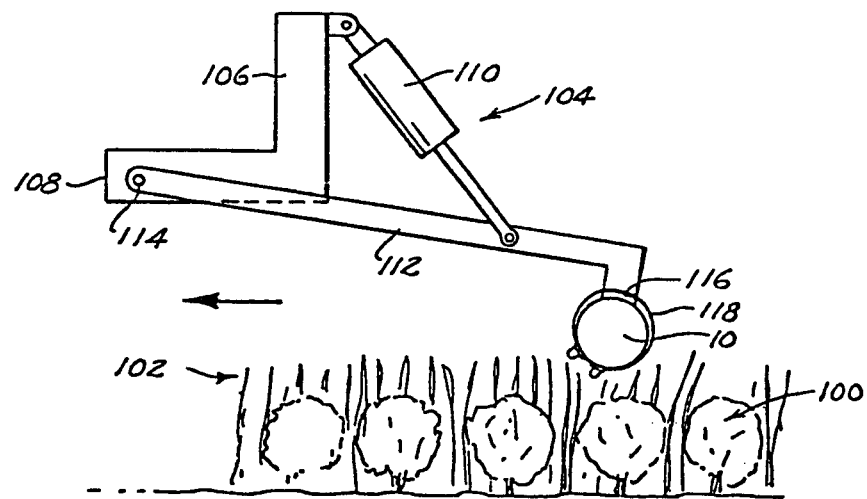
FIG. 6 is a view in front elevation showing use of the apparatus.

FIG. 6 shows the manner of use of the applicator 10 of both embodiments. In use, applicator 10 after being filled with a suitable herbicide, either selective or nonselective, is drawn across the field with its axis transverse to the rows of the crop, and preferably with the applicator at an elevation slightly above the cultivated plants 100, such as cotton, but below the level of the higher weeds 102, so that the herbicide is applied to the portions of the weeds which grow above the level of the crop. It has been found convenient to mount applicator 10 on the usual hydraulic lift assembly 104 of a tractor. Such lift assemblies include a frame 106, the forward end 108 of which is secured to a tractor (not shown) and which includes one or more hydraulic cylinders 110. Applicator 10 can be mounted at the end of a pivoted bar 112 of the lift assembly which swings up and down about an axis 114 in response to operation of cylinder 110. Applicator 10 can easily be secured, for example, to a flat transversely extending bar 116 of the lift apparatus, in any suitable manner such as with hose clamps 118. Hose clamps 118 can be positioned at spaced intervals around the applicator body under the wick elements.

FIGS. 3 and 5 each show the applicator in a preferred position when in use, for applying a chemical to plants in a field. This position corresponds to the position of FIG. 6 where the applicator is moved to the left. As is evident from FIGS. 3 and 5, the exposed portions of the wicks such as exposed portions 21 and 22 extend forwardly and downwardly with respect to the center of body 12 and are located only along a portion of the body which is less than one-half its circumferential periphery. In the preferred form shown and described, the exposed portions of the wicks extend only along a circumferential sector 120 of the body which is not greater than 90°.

Figure 7:
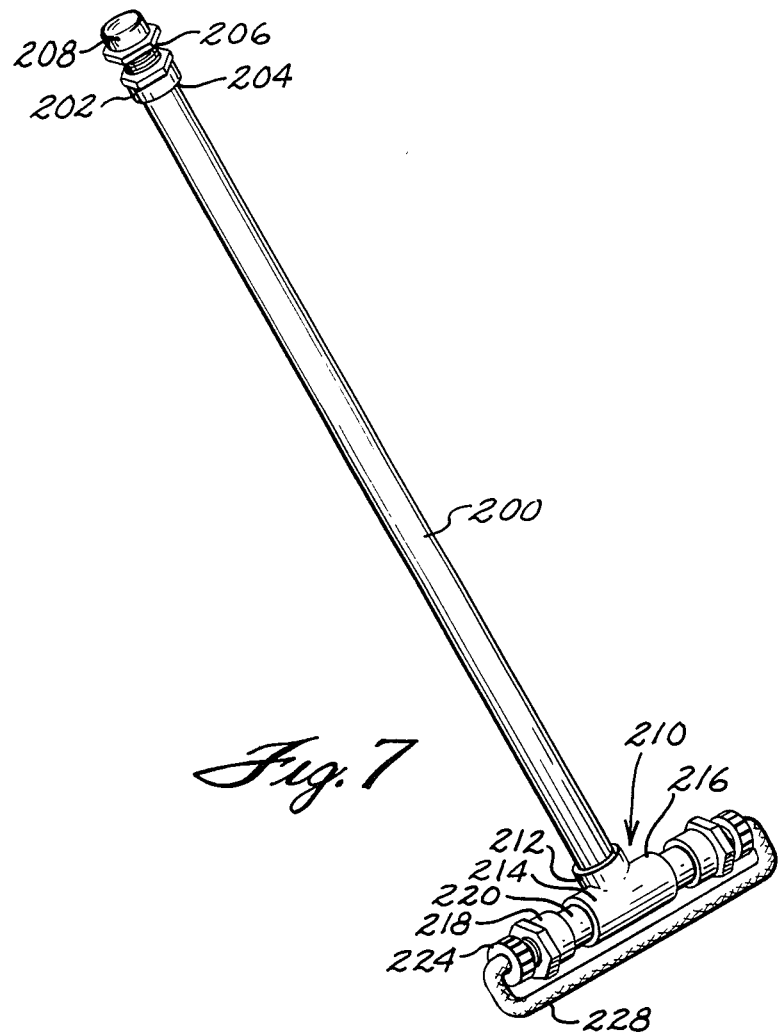
FIG. 7 is a pictorial representation of a variation of the present invention in the form of a hand held weed killer applicator; and, FIG. 8 is an enlarged view in section of the applicator head of the applicator of FIG. 7.
Figure 8:
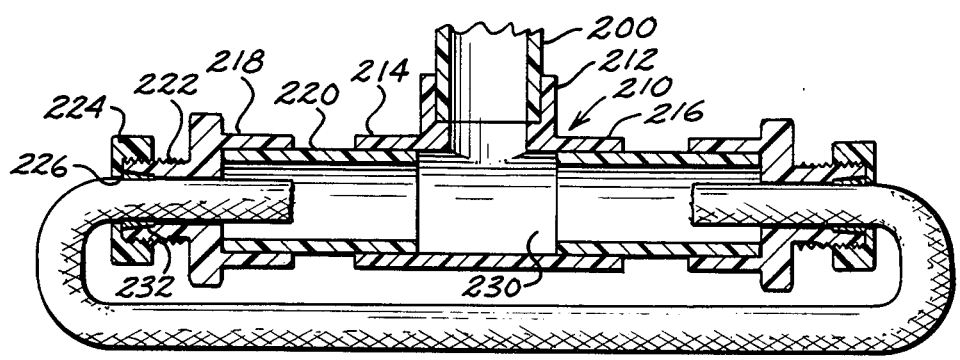

A hand held and operated rope wick applicator for killing weeds is shown in FIGS. 7 and 8 and will be seen to include an elongated handle 200 of ¾" polyvinyl chloride pipe and hollow in order to function as a part of the reservoir for holding the chemical to be applied to the weeds. Mounted on the top of handle 200 is a filling neck in the form of a plastic pipe fitting known as an adapter 202 having a socket end 204 which receives and is attached to the top of handle 200 by polyvinyl chloride cement. Adapter 202 has a threaded end 206 to which is screwed cap 208 in order to retain the chemical within handle 200. A ½" (threaded)×¾" (socket) adapter when ¾" PVC pipe is used for handle 200, and is also of PVC. The opening through adapter 202 functions as a filling opening for filling a weed killer solution into the applicator when cap 208 is removed.

A tee 210 with three sockets 212, 214, and 216 is connected at end 212 to the lower end of pipe 200 with PVC cement and a second adapter 218 similar to adapter 202 is in communication with the tee 210 via a short pipe 220. Pipe 220 is cemented at one end to tee section 214 and at its other end to the socket of adapter 218. Adapter 218 has a threaded end 222 onto which a compression nut 224 is threaded. A sealing ring 226 is disposed within adapter 218 against compression nut 224 and one end of the wick rope 228 passes through nut 224, sealing ring 226, and adapter 218, into the reservoir 230 formed by pipe 220, tee 210 and handle 200.

The inside of the threaded end 222 of adapter 218 is flared outwardly to provide a frusto-conical seat 232 for seal ring 226 which can be of trapezoidal or triangular section, and which is disposed between the seat 232 and the transverse annular surface of nut 224. As nut 224 is threaded onto end 222, seal ring 226 is forced radially inwardly into tight gripping and sealing engagement with a short length of the exterior surface of the wick. Seal ring 226 can be of rubber or flexible plastic material and has a cylindrical inner surface. The extent of compression and sealing of the wick is readily controlled by manipulation of nut 224, which functions as a compression nut.

It is noted that only the left-hand side of the applicator of FIG. 8 has been described in detail above although it is evident that the right-hand side is of identical construction. The embodiment of FIGS. 7 and 8 possesses all of the advantages that the units of FIGS. 1-6 possess and in addition possesses the advantage that a manipulatable assembly has been provided which can be used in areas inaccessible by a tractor mounted unit, and which assembly can be used on a lawn or home garden. It will thus be apparent that this invention provides the art with an apparatus which can quickly, easily and efficiently kill weeds and the like over, under, around and between trees, posts, bushes, buildings, and other stationary objects or the like. By making the apparatus available in a portable embodiment as in FIGS. 7 and 8, the movement of the wick 228 can be effected in any direction.

It is to be noted particularly that the chemical applicator of FIGS. 7 and 8 is of fabricated construction, being formed from readily available plastic pipe cut to required length, and a plurality of also readily available plastic pipe fittings, which are easily assembled and cemented together to form a leak free applicator. The nuts 224 can be formed from plastic caps which are internally threaded, by forming openings to receive the rope through the ends of the caps. Alternatively, these nuts can be custom molded to fit the threads 222 on the adapter fittings 218. This hand held version of the applicator is especially easy to fabricate where all the parts are of PVC since PVC cement readily forms a liquid tight joint between the several connections between the fittings and the plastic pipe.

The fact that the handle functions as part of the reservoir to hold the liquid chemical, in the embodiment of FIGS. 7 and 8, permits a relatively light weight and rugged construction for this applicator. Further, where the applicator head is relatively small, which is permitted by using the handle as part of the reservoir, the applicator balances easily in the hands of the user since there is no heavy head at the end of the unit. In addition the head of liquid in the handle when the handle is at least partly full of chemical assists wetting the wick.

While several preferred embodiments of an apparatus for applying chemical to plants have been shown and described in the environment of an applicator for a weed killer, it is to be understood that the apparatus can be used to apply any desired chemical to plants. It will also be appreciated that numerous changes can be made in the preferred embodiments described herein. For example, body 12 in the embodiment of FIGS. 1-5, can be square or rectangular rather than circular, and rather than individual wick elements with free or cut ends 74, a single length of wick material can be threaded in and out of the body openings so that several exposed portions along the length of the body are integrally connected by unexposed loops within the body.

It will be apparent from the foregoing that many other variations and modifications may be made in the structures and methods described herein without departing substantially from the essential concept of the present invention. Accordingly, it should be clearly understood that the forms of the invention described herein and depicted in the accompanying drawings are exemplary only and are not intended as limitations in the scope of the present invention.

What is claimed is:

1. Apparatus for applying a chemical to plants comprising
    a reservoir comprising an elongated hollow body having an interior and an exterior, and means for closing each end of the body;
    said reservoir having a first opening and a second opening spaced from said first opening, said openings being in opposite ends of said reservoir and generally axially aligned with each other;
    wick means for applying the chemical to plants and comprising a rope wick having opposite ends thereof in fluid communication respectively with said reservoir, through said openings, and having an exposed portion between said ends extending along the outside of said body;
    seal means for peripherally sealing said wick with respect to said reservoir at a first location between said exposed portion and one of said ends of the wick;
    said means for peripherally sealing said wick with respect to said reservoir at a second location between said exposed portion and the other of said ends of the wick; and
    additional means for containing the chemical and connected to reservoir for supplying the chemical to the reservoir.

2. Apparatus according to claim 1 wherein said additional means comprises,
    a rigid handle fixed to said reservoir for manual manipulation thereof.

3. Apparatus according to claim 1 further comprising elongated manually grippable rigid handle means secured to said reservoir and extending generally transversely thereof,
    said handle means including a pipe communicating with and sealed to said reservoir,
    said pipe comprising said additional means for supplying the chemical to the reservoir.

4. Apparatus according to claim 3 further comprising a filling opening at the end of the handle remote from the reservoir, and
    closure means for said opening.

5. Apparatus according to claim 4 wherein said body and handle means comprise a plurality of individual rigid plastic pipes and pipe fittings cemented together to form a rigid unit.

6. Apparatus according to claim 3 wherein the reservoir has an internal diameter approximately the same as the internal diameter of the pipe of said handle.

7. Apparatus according to claim 1 wherein said seal means each comprise
    a seal element; and
    seal compressing means for compressing each of said seal elements to peripherally seal said wick with respect to said reservoir.

8. Apparatus according to claim 1 wherein said addition means for containing the chemical comprises a pipe extending perpendicularly with respect to said reservoir.

* * * * *